United States Patent
Ota

(10) Patent No.: US 10,496,068 B2
(45) Date of Patent: Dec. 3, 2019

(54) ELECTRONIC DEVICE AND CONTROLLING METHOD

(71) Applicant: CANON KABUSHIKI KAISHA, Tokyo (JP)

(72) Inventor: Hiroki Ota, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/934,284

(22) Filed: Mar. 23, 2018

(65) Prior Publication Data
US 2018/0284714 A1   Oct. 4, 2018

(30) Foreign Application Priority Data
Mar. 30, 2017   (JP) .................. 2017-068740

(51) Int. Cl.
*G05B 19/05* (2006.01)
*G05B 19/042* (2006.01)

(52) U.S. Cl.
CPC ....... *G05B 19/054* (2013.01); *G05B 19/0423* (2013.01); *G06F 2213/0052* (2013.01)

(58) Field of Classification Search
CPC ............ G06F 3/00; G06F 13/14; G06G 13/00
USPC .......................................................... 410/4
See application file for complete search history.

(56) References Cited

U.S. PATENT DOCUMENTS

| | | | |
|---|---|---|---|
| 8,525,924 B2 | 9/2013 | Jannard | |
| 8,525,925 B2 | 9/2013 | Jannard | |
| 2006/0143353 A1* | 6/2006 | Son | H04N 21/4104 710/302 |
| 2010/0165138 A1 | 7/2010 | Jannard | |
| 2010/0165188 A1 | 7/2010 | Jannard | |
| 2010/0217835 A1* | 8/2010 | Rofougaran | H04M 1/04 709/218 |
| 2011/0113162 A1* | 5/2011 | Miyasaka | G06F 13/4022 710/11 |
| 2013/0127882 A1* | 5/2013 | Wu | G06F 3/14 345/502 |
| 2013/0191557 A1* | 7/2013 | Sip | G06F 13/10 710/16 |
| 2014/0006678 A1* | 1/2014 | Lai | G06F 13/385 710/316 |
| 2018/0288305 A1 | 10/2018 | Ota | |

FOREIGN PATENT DOCUMENTS

JP   2012-514391 A   6/2012
WO   2010/078173 A1   7/2010

* cited by examiner

*Primary Examiner* — Getente A Yimer
(74) *Attorney, Agent, or Firm* — Carter, DeLuca & Farrell LLP

(57) ABSTRACT

An electronic device includes a main module and sub modules. The sub modules includes a first sub module and a second sub module. The electronic device searches for a communication address for the main module and the first sub module to communicate, and changes a connection route between the first sub module and the second sub module from a disconnected state to a connected state, after the communication address is found.

22 Claims, 14 Drawing Sheets

FIG. 6

CONNECTION CORRESPONDENCE INFORMATION

| SCAN NUMBER | MODULE TYPE | COMMUNICATION ADDRESS | CONNECTABLE ORDER |
|---|---|---|---|
| 1 | BATTERY A | 0x21 | TERMINATION |
| 2 | BATTERY B | 0x22 | TERMINATION |
| 3 | BATTERY C | 0x23 | TERMINATION |
| 4 | POWER MODULE | 0x1F | TERMINATION |
| 5 | MODULE A (EXTERNAL I/O) | 0x10 | 1~3 |
| 6 | MODULE B (WIRELESS COMMUNICATION) | 0x15 | 1~2 |
| 7 | MODULE C (VIDEO OUTPUT) | 0x1A | 1 |
| 8 | MODULE D (COOLING) | 0x14 | 1 |
| ⋮ | ⋮ | ⋮ | ⋮ |
| N | | | |

~503

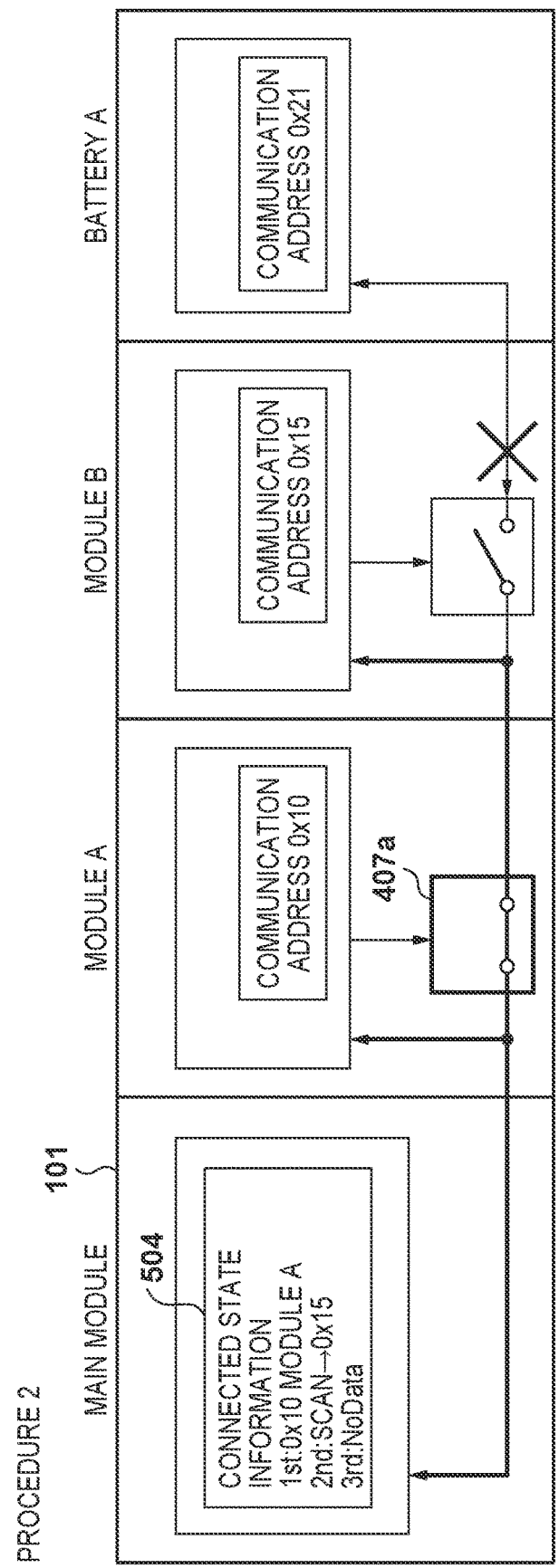

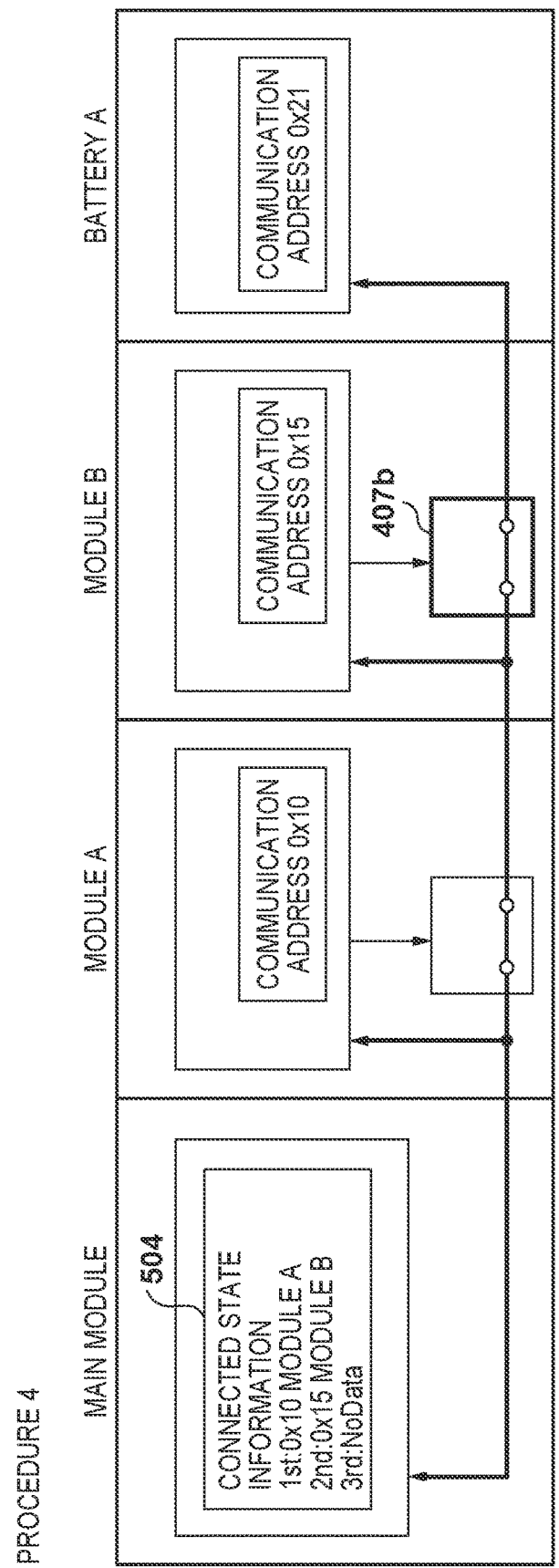

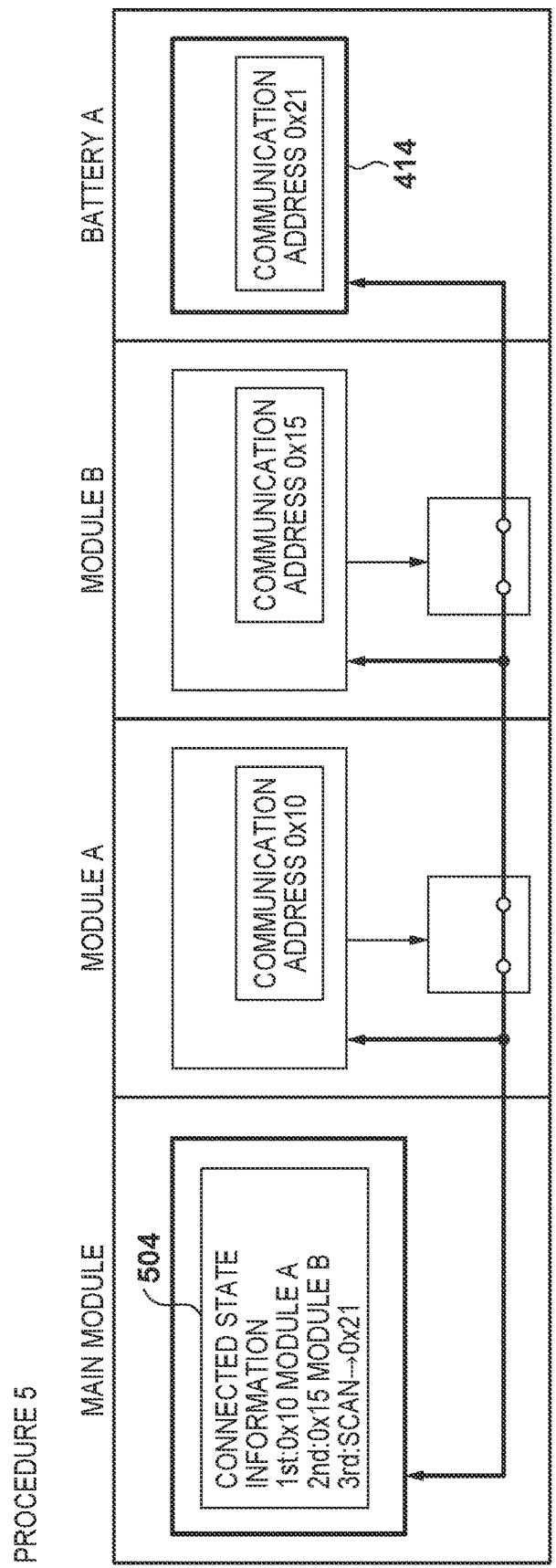

ELECTRONIC DEVICE AND CONTROLLING METHOD

BACKGROUND

Field of the Invention

Aspects of the present inventions generally relate to an electronic device having modules, an electronic device capable of acting as a main module, an electronic device capable of acting as a sub module, and methods of controlling the electronic devices.

Description of the Related Art

Japanese Patent Laid-Open No. 2012-514391 recites an example of a module exchange type electronic device configured by removable modules (an image sensor module, a power module, a recording module, and the like).

In the case of a module exchange type electronic device configured by one main module and sub modules, even if a connecting order of the sub modules changes, it is desirable for there to be no change in a function or service that the electronic device provides. However, in practice because transmission signal quality, power supply efficiency, electromagnetic interference (EMI), electromagnetic compatibility (EMC) and the like between sub modules exert an influence on an electronic device, it is not necessarily the case that the electronic device can provide this function or service regardless of the connecting order. Accordingly, in such a module exchange type electronic device, it is desirable that it can be recognized by the main module what type of sub modules are connected and in which order.

SUMMARY

According to an aspect of the present invention, an electronic device including a main module and sub modules, an electronic device capable of acting as a main module, or an electronic device capable of acting as a sub module is improved.

According to an aspect of the present invention, there is provided an electronic device, comprising: a main module; sub modules including a first sub module and a second sub module; a search unit that searches for a communication address for the main module and the first sub module to communicate; and a changing unit that changes a connection route between the first sub module and the second sub module from a disconnected state to a connected state, after the communication address is found.

According to an aspect of the present invention, there is provided a method comprising: searching for a communication address for a main module and a first sub module to communicate; and changing a connection route between the first sub module and a second sub module from a disconnected state to a connected state, after the communication address is found.

Further features and aspects of the present invention will become apparent from the following description of exemplary embodiments.

BRIEF DESCRIPTION OF THE DRAWINGS

FIG. 6 is a view that illustrates an example of connection correspondence information for performing a scan of a communication address.

FIGS. 7A through 7G are views for illustrating an overview of a module recognition process.

DESCRIPTION OF THE EMBODIMENTS

The drawings, which are incorporated in and constitute a part of the specification, illustrate exemplary embodiments, features, and aspects of the present invention.

First Embodiment

An electronic device 100 in the first embodiment is a module exchange type electronic device configured by removable modules. The removable modules include one main module and one or more sub modules. The main module is an electronic device that is capable of acting as the main module, and each sub module is an electronic device that is capable of acting as a sub module.

Figure 1A:
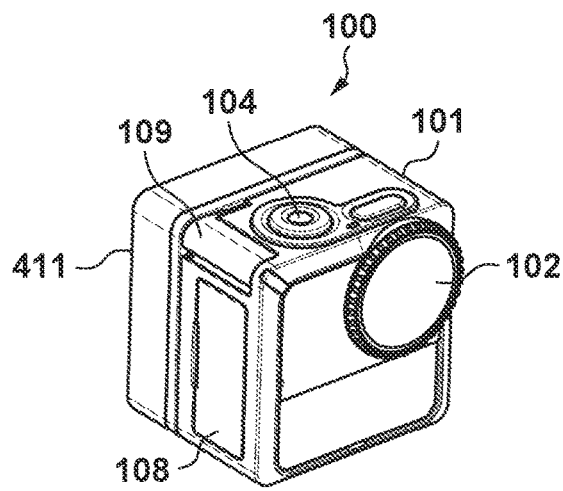
FIGS. 1A through 1D are views that illustrate an example in which an electronic device 100 is configured by a main module 101 and one sub module.
Figure 1B:
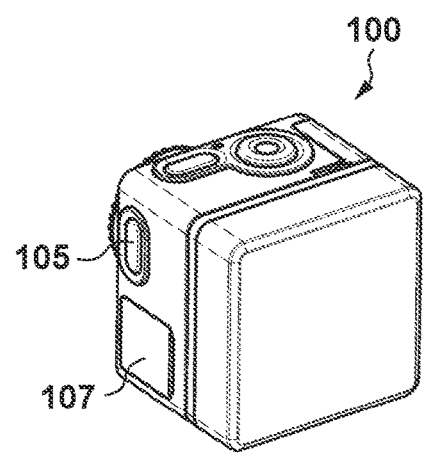
Figure 1C:
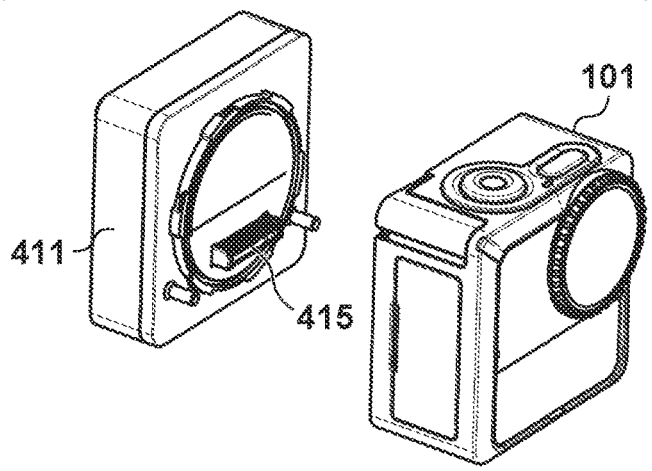
Figure 1D:
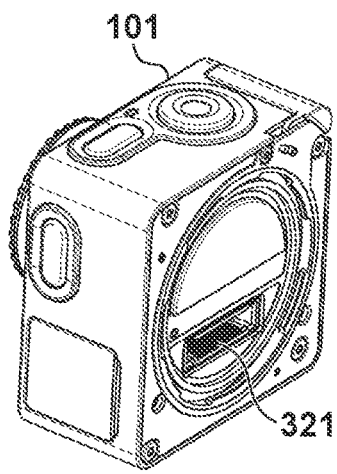

Referring to FIG. 1A, FIG. 1B, FIG. 1C, and FIG. 1D, description is given of an example in which the electronic device 100 is configured by a main module 101 and one sub module. With FIG. 1A, FIG. 1B, FIG. 1C, and FIG. 1D, description is given of an example where a power module 411 as the one sub module is connected to the main module 101. FIG. 1A is a perspective view of a case where the electronic device 100 is seen from a front side (main module 101 side), and FIG. 1B is a perspective view of a case where the electronic device 100 is seen from a rear side (power module 411 side). FIG. 1C is a view illustrating a state where the power module 411 is separated from the main module 101, and FIG. 1D is a perspective view of a case where the main module 101, from which the power module 411 has been removed, is seen from a rear side. In the first embodiment, description is given of an example where the main module 101 is an electronic device that can act as an image capturing apparatus (for example: a digital camera). Furthermore, in the first embodiment, description is given of an example where the power module 411 is an electronic device that can act as a power supply apparatus for supplying power to the main module 101 and sub modules different to the power module 411.

Figure 3:
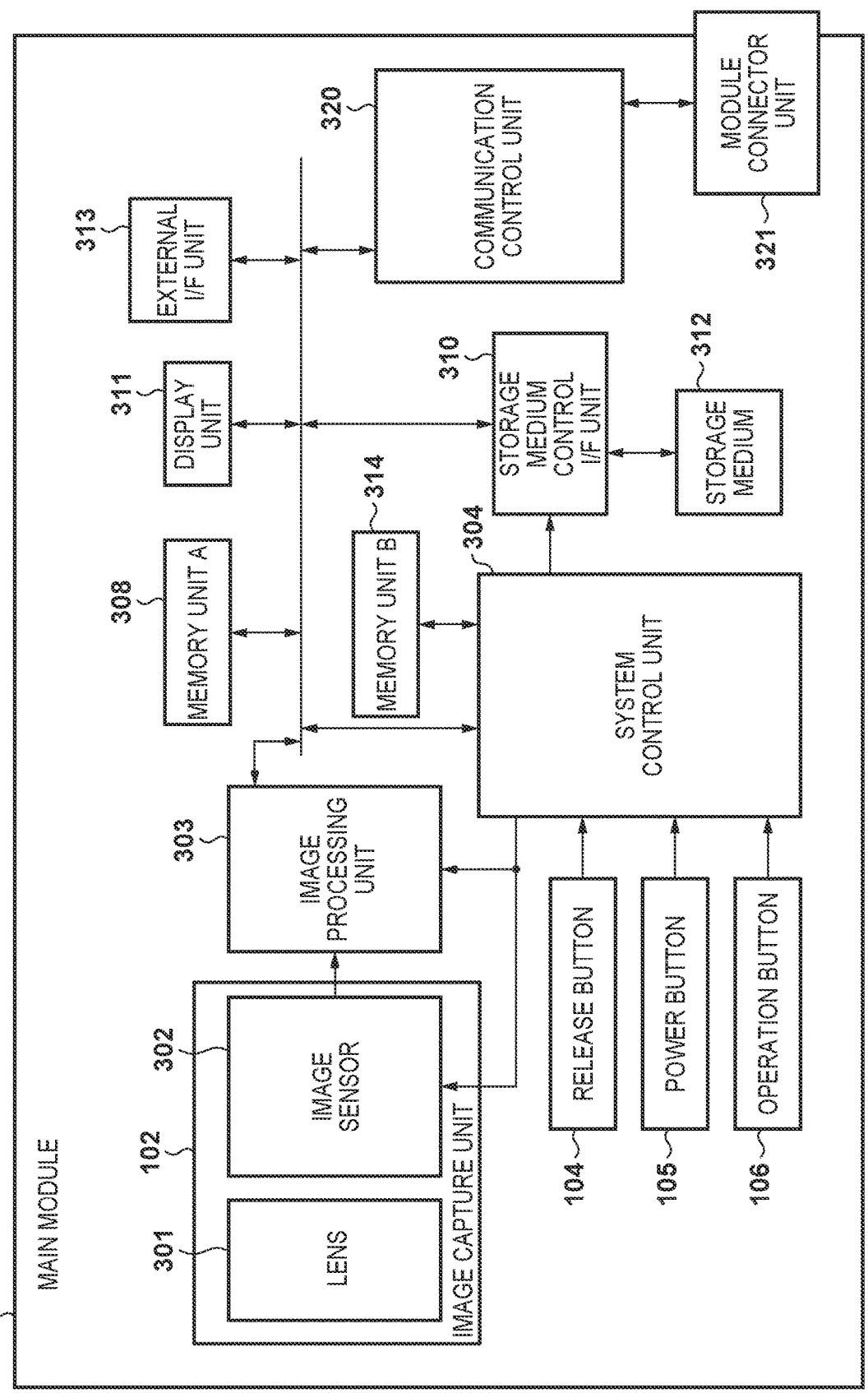
FIG. 3 is a block diagram which illustrates an example of components of the main module 101.

The main module 101 has an image capture unit 102. As illustrated in FIG. 3, the image capture unit 102 has an image sensor 302 for generating an image signal corresponding to an optical image of a subject, and a lens unit 301 for guiding light from the subject to the image sensor 302. A release button 104 is provided on a top surface portion of the main module 101. The release button 104 is capable of a two-stage pressing operation (a half press and a full press). When a user performs a half press operation of the release button 104, preparation operations for image capturing (including a light metering operation and a distance measurement operation) are started. When the user further performs a full press operation of the release button 104, an image capturing operation is started, and image data generated by this image capturing operation is recorded in a storage medium 312 (FIG. 3) in a storage chamber 107.

A power button 105 for inputting power for the main module 101 is provided on a side surface portion of the main module 101. A jack for signal input/output is also provided, and is covered by a jack cover unit 108 for protection. By opening the jack cover unit 108, a user can connect an external apparatus to an external interface unit 313 (FIG. 3). The power module 411 is connected to the back portion of the main module 101. The user can remove the power module 411 by performing an operation for causing a lock member 109 to rotate from a lock position to a lock release position.

A module connector unit 321 for making a connection with a sub module is arranged on a back portion of the main module 101. A module connector unit 415 for making a connection with the main module 101 or another sub module is arranged on a front surface portion of the power module 411. When the power module 411 is connected to the main module 101, the module connector unit 321 and the module connector unit 415 fit.

Note that sub modules that can be connected to the main module 101 include the follow modules, for example.

A power module that has a power source (a primary battery or a secondary battery) and supplies power to another sub module and the main module 101.

An external I/O (input/output) module having a connector for communicating with an external apparatus.

An NFC (Near Field Communication) module for performing short-range wireless communication.

A communication module for sending and receiving data by wireless communication with an external apparatus.

A speaker module for outputting music or an operation sound.

A microphone module for inputting audio.

A large capacity recording module for saving data exceeding the capacity of a storage medium.

A display module in which a liquid crystal display apparatus (for example, a liquid crystal display apparatus) or the like is provided.

A cooling unit for heat accumulation of heat generated by the main module 101 or a sub module.

However, sub modules are not limited to that exemplified in the first embodiment. Regardless of the functions that an apparatus has, it can be configured as a sub module if it is an apparatus that can be connected to the main module 101 or another sub module.

A user can select a sub module from these sub modules, and use the selected sub module after attaching it to a back portion of another sub module or the main module 101. Further connecting to a back surface of an attached sub module is also possible depending on the type of the sub module. A serial communication connection as with a daisy chain is achieved between a sub module connected to the back surface of the main module 101 and a sub module further connected to the back surface thereof.

Figure 2A:
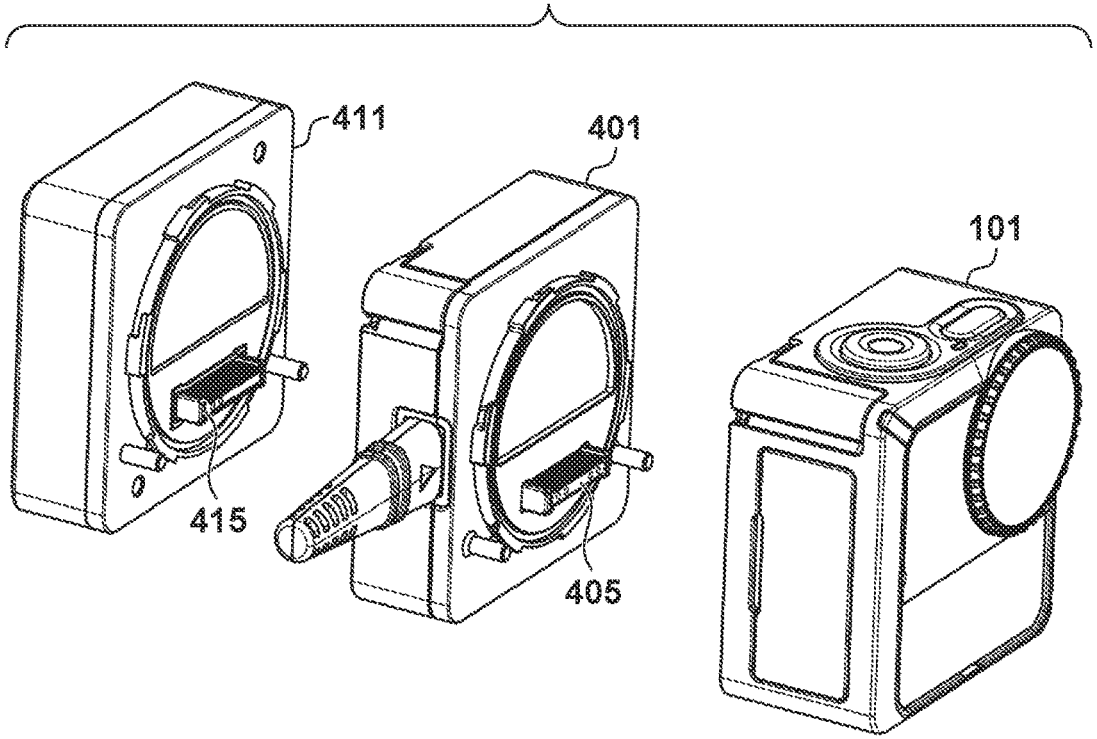
FIGS. 2A through 2B are views that illustrate an example in which the electronic device 100 is configured by the main module 101 and sub modules.
Figure 2B:
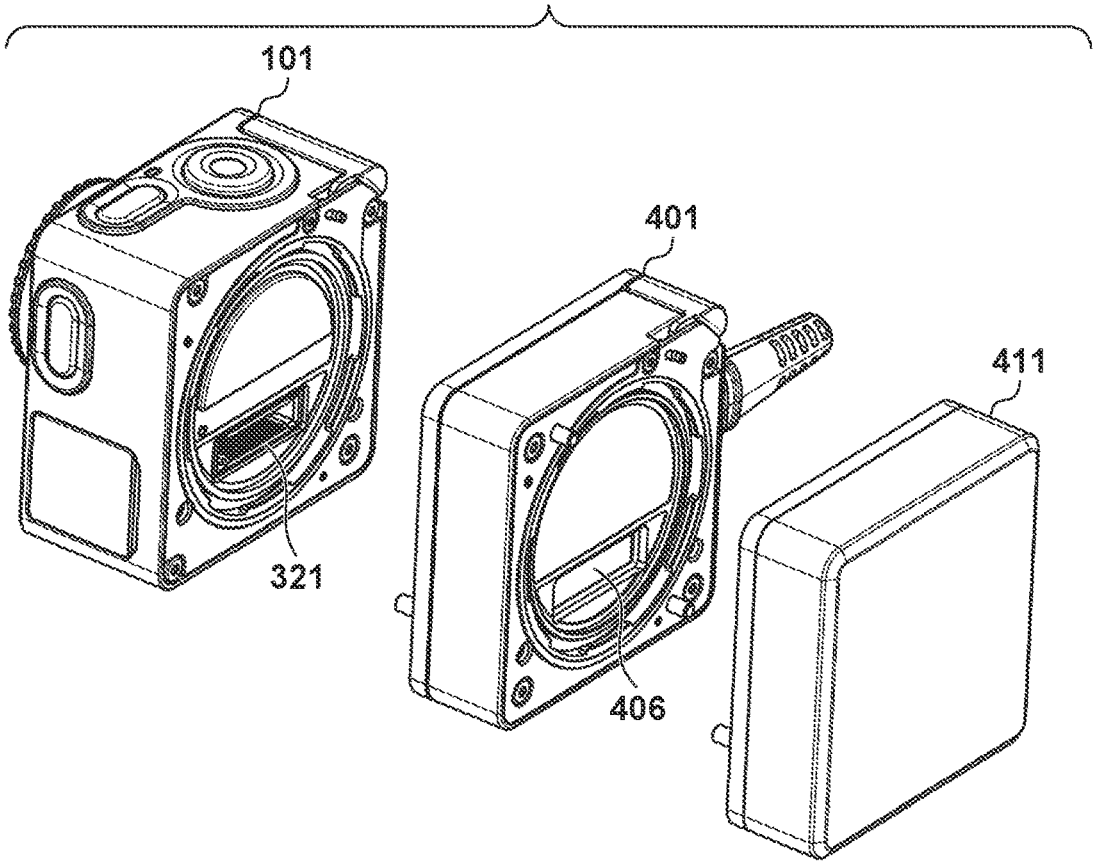

Next, with reference to FIG. 2A and FIG. 2B, description is given of an example in which the electronic device 100 is configured by the main module 101 and sub modules. With FIG. 2A and FIG. 2B, description is given of an example where an external I/O module 401 and the power module 411 are connected to the main module 101 as the sub modules. FIG. 2A is a perspective view of a case where the electronic device 100 is seen from a front side (main module 101 side), and FIG. 2B is a perspective view of a case where the electronic device 100 is seen from a rear side (power module 411 side).

A module connector unit for making a connection between modules is provided in the external I/O module 401, similarly to the main module 101 and the power module 411. A module connector unit 405 is a preceding connection unit for connecting with the main module 101 which is positioned preceding the external I/O module 401. In addition, a module connector unit 406 is a subsequent connection unit for connecting with the power module 411 which is positioned more subsequent than the external I/O module 401. The main module 101 and respective sub modules are connected by using these module connector units 321, 405, 406, and 415.

Next, with reference to FIG. 3, description is given for an example of components of the main module 101.

In FIG. 3, the image capture unit 102 has the image sensor 302 for generating an image signal corresponding to an optical image of a subject, and the lens unit 301 for guiding light from the subject to the image sensor 302. An image signal generated by the image sensor 302 is supplied to an image processing unit 303. The image processing unit 303 generates image data (may be still image data or moving image data) from the image signal from the image capture unit 102. The image data generated by the image processing unit 303 may be encoded by a predetermined encoding method (lossless compression encoding method, lossy compression encoding method, or the like).

A system control unit 304 has a memory storing a program for controlling all the components of the main module 101, and a processor for executing the program to control all the components of the main module 101. The processor included in the system control unit 304 is a hardware processor, for example.

A memory unit A 308 temporarily stores image data generated by the image processing unit 303, and image data read from the storage medium 312. A storage medium control interface unit 310 performs a process (recording process) for reading image data from the memory unit A 308 and writing this image data to the storage medium 312, and a process (reproduction process) for reading image data from the storage medium 312 and writing this image data to the memory unit A 308. The storage medium 312 is a storage medium that has a non-volatile semiconductor memory or the like, and can be removed from the main module 101. A display unit 311 displays information indicating a state of the main module 101 to thereby convey the state of the main module 101 to a user. The external interface unit 313 is a communication interface for communicating with an external apparatus such as an external computer. A memory unit B 314 stores, for example, a result of computation by the system control unit 304.

Information relating to a driving condition of the main module 101 that is set by a user using an operation button 106 is sent to the system control unit 304. The system control unit 304 performs control of the main module 101 overall, based on this information. A communication control unit 320 is connected to the system control unit 304 and the module connector unit 321. Furthermore, the communication control unit 320 is communicably connected to all sub modules directly or indirectly connected to the main module 101, via a communication terminal of the module connector unit 321. The communication control unit 320 can communicate with a communication control unit of each sub module, as described later.

Figure 4B:
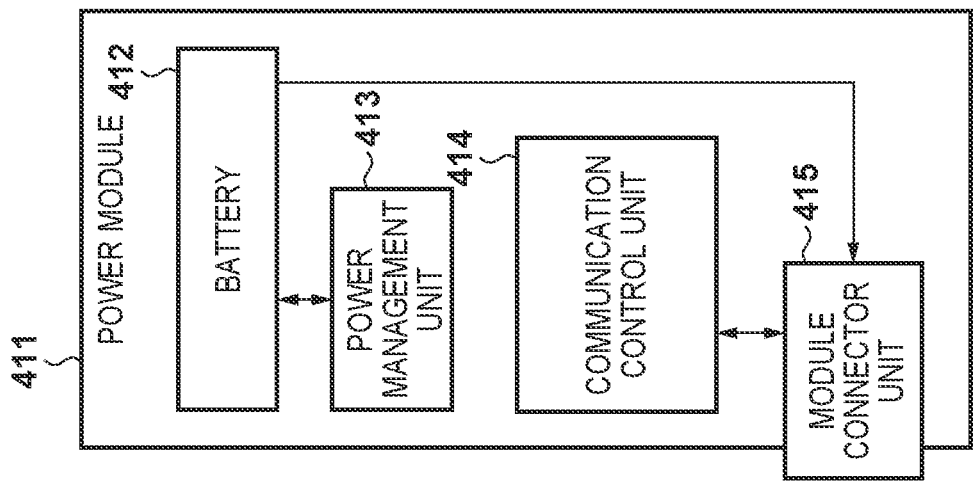
FIG. 4B is a block diagram which illustrates an example of components of a power module 411.
Figure 4A:
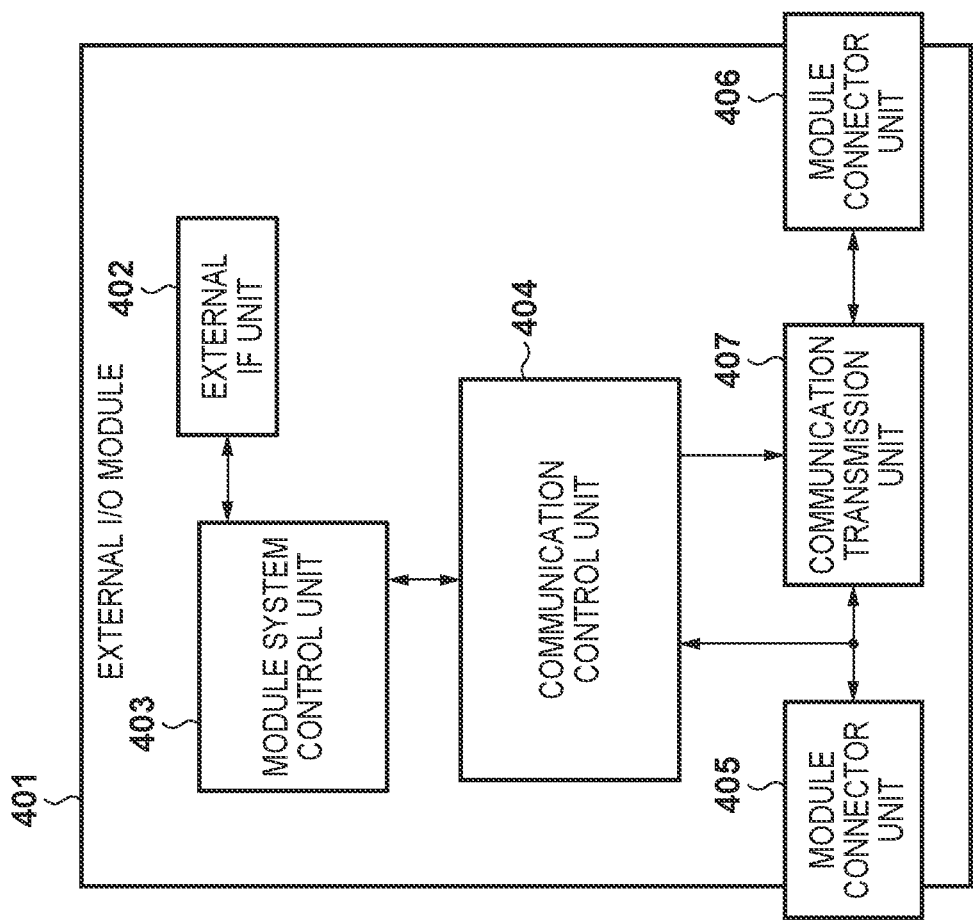
FIG. 4A is a block diagram which illustrates an example of components of an external I/O module 401.

Next, with reference to FIG. 4A and FIG. 4B, description is given for an example of internal configurations of two sub modules of differing types. FIG. 4A is a block diagram which illustrates an example of components of the external I/O module 401. FIG. 4B is a block diagram which illustrates an example of components of the power module 411.

In FIG. 4A, the external I/O module 401 has an external I/F unit 402 for connecting with an external apparatus, and a module function thereof is realized by a module control unit 403. A communication control unit 404 performs a communication process for realizing a communication function with the main module 101 or another sub module. The module connector unit 405 and a module connector unit 406 are connectors for connecting with the main module 101 or another sub module. The module connector unit 405 is a preceding connection unit for making an electrical connection with a module that is preceding it (a side closer to the main module 101). The module connector unit 406 is a subsequent connection unit for making an electrical connection with a module that is subsequent to it (a side further from the main module 101). A communication transmission unit 407 functions as a change unit for changing whether to activate or deactivate a function for conveying to the module connector unit 406 a signal transmitted from the module connector unit 405. In other words, the communication control unit 404 performs communication addressed to its own address via the module connector unit 405 which is the preceding connection unit to change the state (a disconnected state (deactivated) or a connected state (activated) of a connection route between the preceding connection unit and a subsequent connection unit) of the communication transmission unit 407.

In FIG. 4B, the power module 411 has a battery 412 for supplying power to the main module 101 and another sub module. Management of power supplied by the battery 412 is performed by a power management unit 413. In addition, similarly to the external I/O module 401, the power module 411 has the module connector unit 415 and a communication control unit 414 for realizing communication with the main module 101. Note that power supplied from the battery 412 is supplied to the main module 101 or respective sub modules via the module connector unit 415. The power module 411 is a terminating module and thus does not need configurations corresponding to the module connector unit 406 which is for connecting with a subsequent sub module, and the communication transmission unit 407 which is for relaying between a preceding module connector unit and a subsequent module connector unit.

Figure 5:
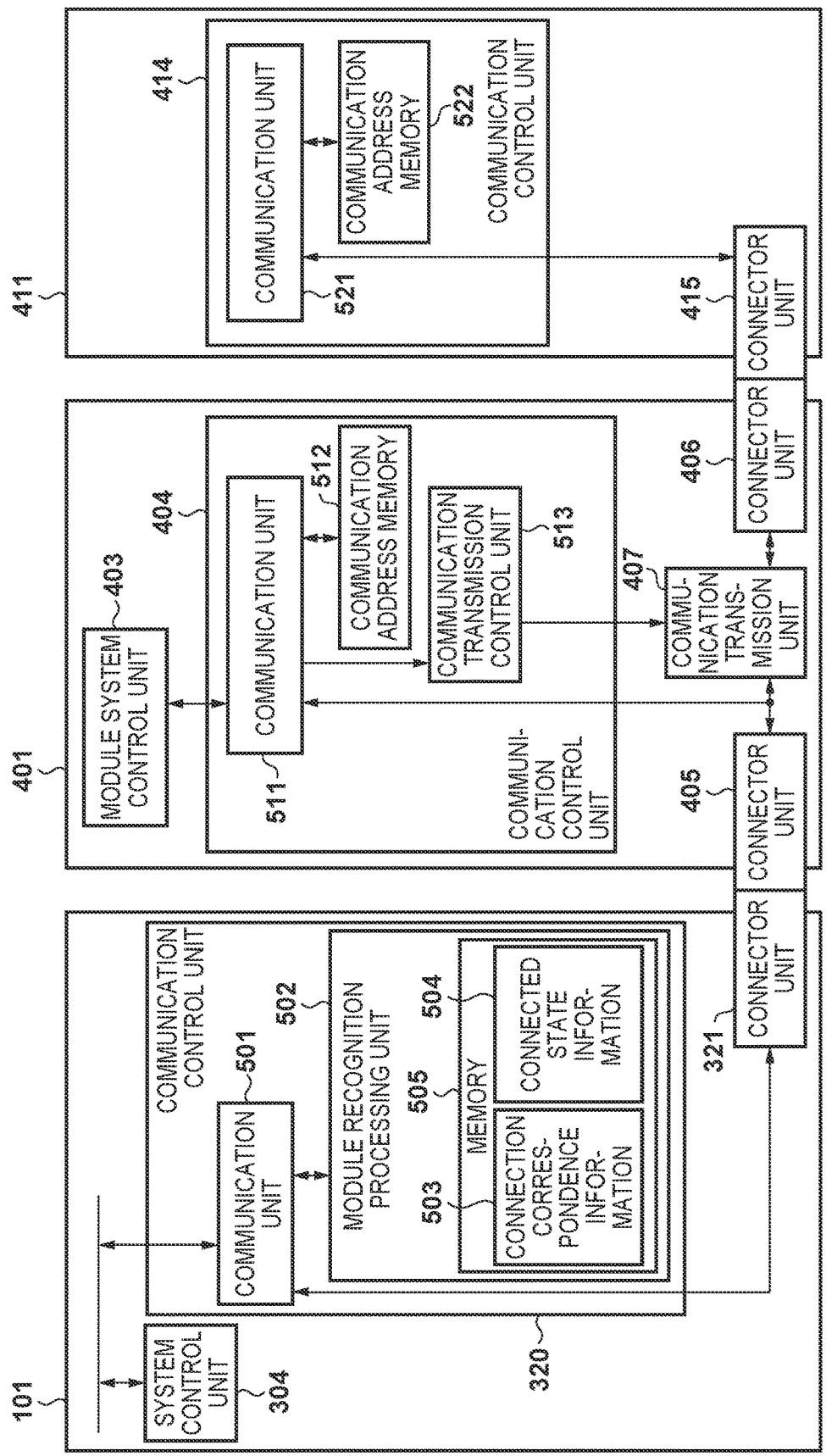
FIG. 5 is a view for describing an example of communication that is performed between the main module 101 and sub modules.

Next, with reference to FIG. 5, description is given of an example of communication that is performed between the main module 101 and sub modules. FIG. 5 illustrates a state where the main module 101, the external I/O module 401, and the power module 411 are connected.

The main module 101 and the respective sub modules are electrically connected by the module connector units provided therein, and realize communication by communication control units for the respective modules. The communication control unit 320 of the main module 101 has a communication unit 501 for generating a communication waveform based on a predetermined communication format, and a module recognition processing unit 502 for recognizing a sub module connected to the main module 101. A memory 505 of the module recognition processing unit 502 stores connection correspondence information 503 and connected state information 504. Here, the connection correspondence information 503, for example, includes information used to determine whether a connecting order for respective sub modules connected to the main module 101 satisfies a predetermined condition. The connected state information 504, for example, includes information regarding types of the respective sub modules connected to the main module 101, and information regarding the connecting order for the respective sub modules.

The communication control unit 404 of the external I/O module 401 includes a communication unit 511 for generating a communication waveform, and a communication address memory 512 for storing an address used for specifying a communication partner. It is assumed that the communication control unit 320 of the main module 101 uses a communication address to perform communication. If this communication address is the same as that stored in the communication address memory 512 of the external I/O module 401, communication between the main module 101 and the external I/O module 401 is established. Furthermore, the communication control unit 404 has a communication transmission control unit 513 for activating or deactivating the communication transmission unit 407 for transmitting a signal to the module connector unit 406 for connecting to a subsequent sub module. The communication transmission control unit 513 sets activation or deactivation of the communication transmission unit 407 in accordance with communication with the main module 101. Functions of a communication unit 521 and a communication address memory 522 included in the power module 411 are similar to that of the communication unit 511 and the communication address memory 512 included in the external I/O module 401.

FIG. 6 is a view that illustrates an example of a data configuration of the connection correspondence information 503 that the main module 101 has. In the first embodiment, the connection correspondence information 503 has a table in which "module type", "communication address", "connectable order", and "scan number" are registered in association. The "connectable order" represents an order (position) at which the sub module can be connected to the main module 101. For example, the type of a sub module that is only permitted to be connected as the most subsequent (referred to as a termination), and the type of a sub module that is only permitted to be connected first immediately after the main module 101 can be determined in accordance with this "connectable order". The "scan number" represents at which number to execute a scan at the time of an address scan operation for recognizing a sub module. Details of the address scan operation are described later.

Next, with reference to FIGS. 7A through 7G and FIG. 8, a flow for a module recognition process performed in the first embodiment is described.

Figure 7A:
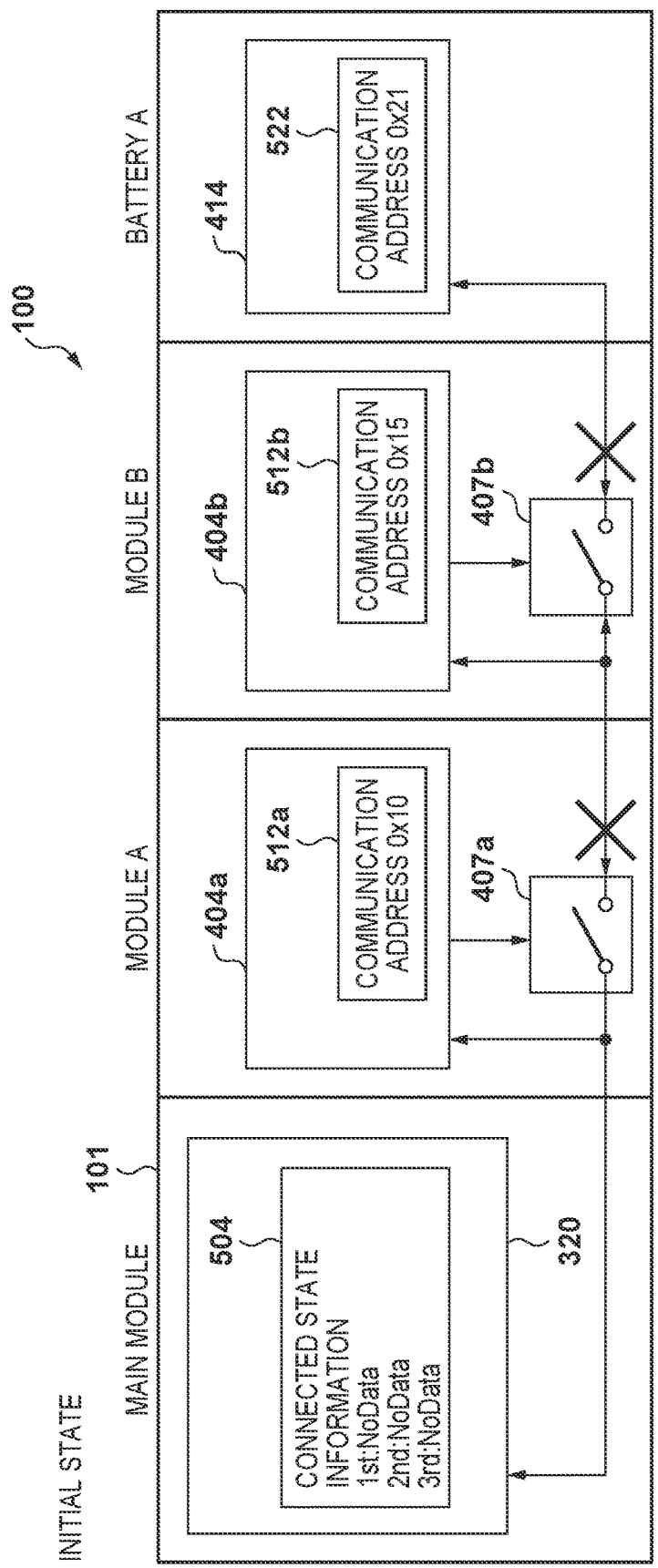

First, with reference to FIGS. 7A through 7G, an overview of a communication operation in the module recognition process is described. The electronic device 100 has a configuration in which the main module 101 and one or more sub modules are connected in series. For one or more sub modules, in an initial state a connection route between a preceding sub module and a subsequent sub module is in a disconnected state. In FIGS. 7A through 7G, a case where three sub modules are connected to the main module 101 is envisioned. It is assumed that respective names of the sub modules are "module A", "module B", and "battery A" in an order from closest to the main module 101, and that they are connected in this order. FIG. 7A illustrates an initial state before the module recognition process, and FIG. 7B through FIG. 7G illustrate a procedure for the module recognition process. In FIG. 7A, information (connected state information) indicating a connected state of a module is not recorded in the connected state information 504 of the main module 101. In addition, a communication transmission unit 407a and a communication transmission unit 407b of the module A and the module B are both in a deactivated state, and a communication transmission to a subsequent sub module is in a cutoff state (a disconnected state).

Figure 7B:
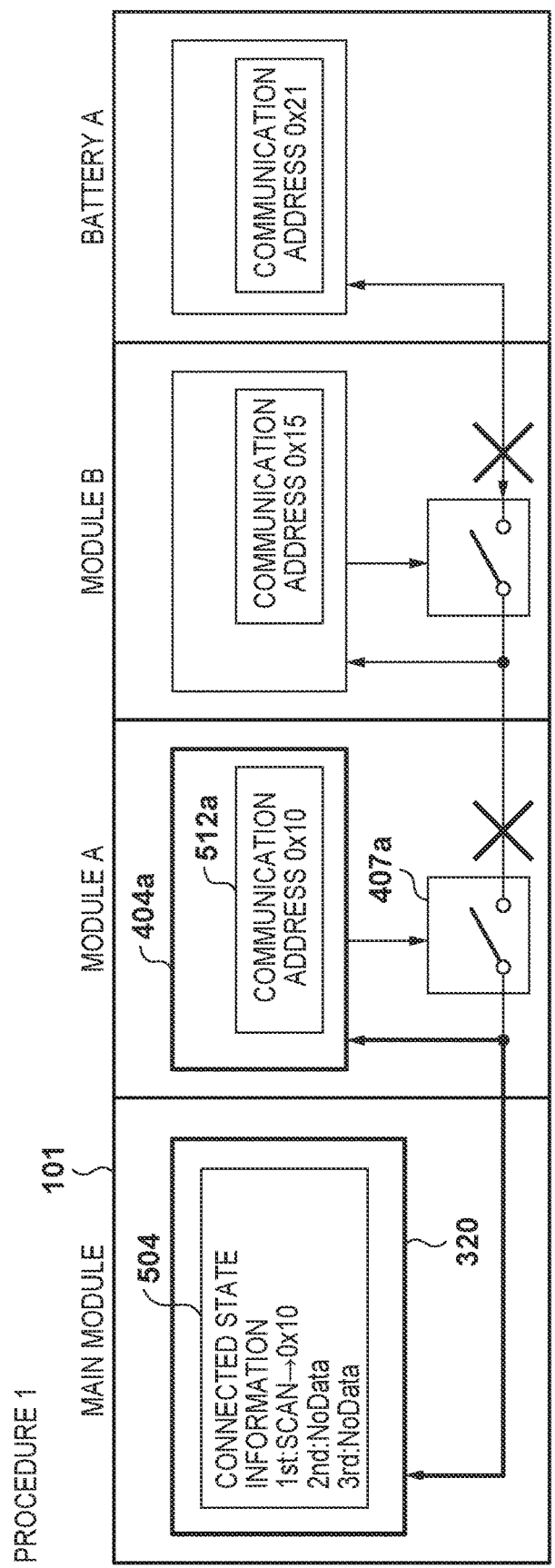

In the state of FIG. 7B, the communication transmission unit 407a is in a deactivated state. Accordingly, what can electrically communicate with the communication control unit 320 of the main module 101 is a communication control unit 404a of the module A first connected immediately after the main module 101. In this state, processing for searching for a communication address for communication between the main module 101 and one sub module is performed. For example, based on the connection correspondence information 503 of FIG. 6, an address scan operation is performed by testing communication using a communication address registered in the order of the scan number. When it has become the turn for the scan number 5, communication with the communication address 0x10 corresponding to "module A" is tested. Because the communication address 0x10 matches to an address stored in a communication address memory 512a of the module A, the communication control unit 404a returns a communication response. Accordingly, communication between the communication control unit 320 and the communication control unit 404a of the module A is established. By this establishment of communication, the main module 101 can recognize that the sub module to which it connected to first is the "module A" of the communication address 0x10. In other words, a type corresponding to the communication address found by the address scan operation out of the connection correspondence information 503 is recognized as the type of the sub module.

After a communication address is found, the connection route for the sub module is changed from a disconnected state to a connected state. In other words, the main module 101 performs communication with the module A, and activates the communication transmission unit 407a of the module A. Accordingly, as illustrated by FIG. 7C, the communication control unit 320 of the main module 101 becomes capable of communication with the communication control unit 404a of the "module A" which is first, and a communication control unit 404b of the "module B" which is connected second subsequent thereto.

Figure 7D:
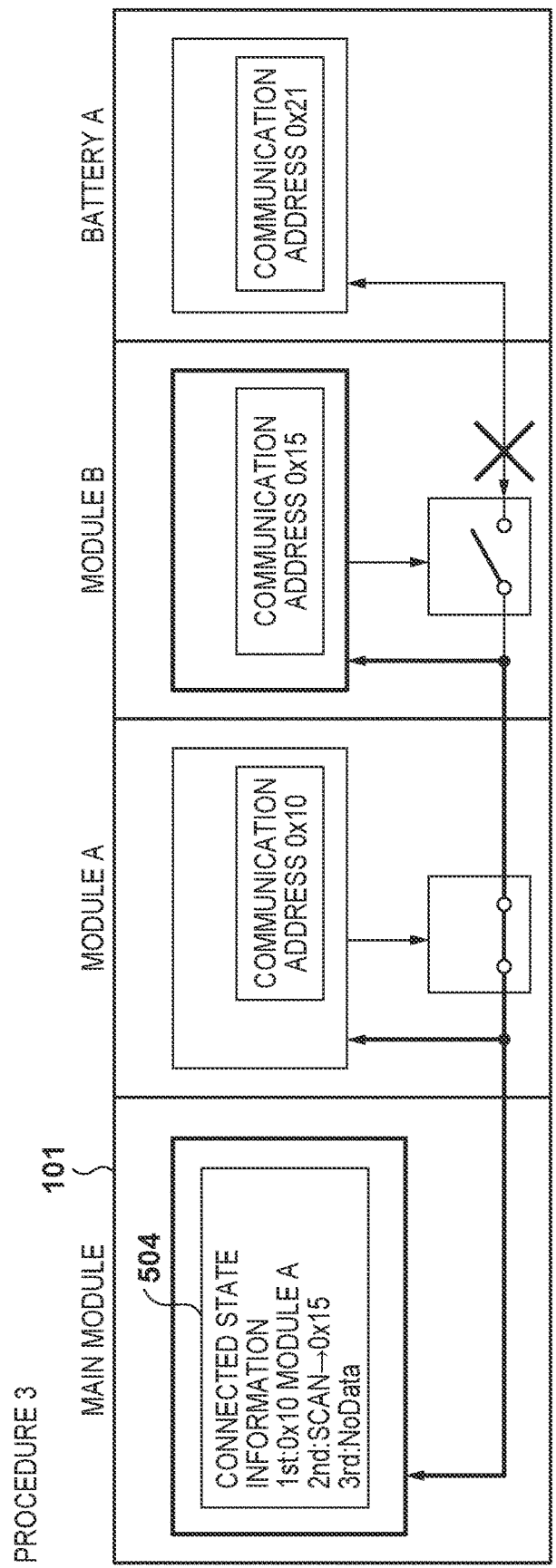
Figure 7G:
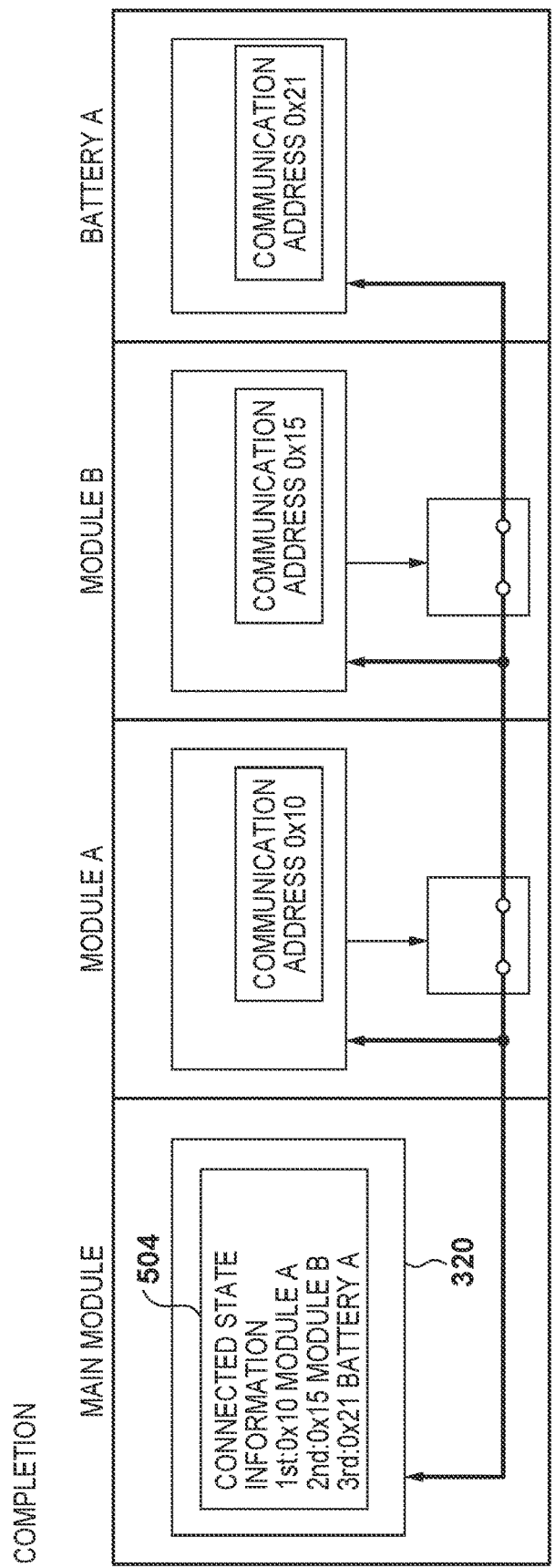

In this state, in FIG. 7D, the communication control unit 320 performs an address scan operation similarly to in FIG. 7B. Accordingly, at the turn for the scan number 6, because the communication address 0x15 is used as the communication address and communication is established, it is recognized that the second module is the "module B". Next, in FIG. 7E, the communication transmission unit 407b of the module B is activated. Accordingly, the communication control unit 320 of the main module 101 becomes capable of communication with the subsequent third module in addition to the "module A" which is first, and the "module B" which is second. The communication control unit 320 performs a similar recognition process in FIG. 7F to thereby recognize that the third module is the "battery A". As is understood by viewing the connection correspondence information 503 of FIG. 6, the battery A is a module that is set at a termination. Accordingly, the communication control unit 320 understands that the battery A is a final stage module, and the series of recognition processes ends. In this way, as illustrated in FIG. 7G, the connected state information 504 in the memory 505 of the main module 101 stores the types and orders for modules that are connected subsequently. As described above, for one or more sub modules connected to the main module 101, the connection routes between a preceding sub modules and a subsequent sub module are set to a connected state, and the main module 101 can communicate with all connected sub modules.

Figure 8:
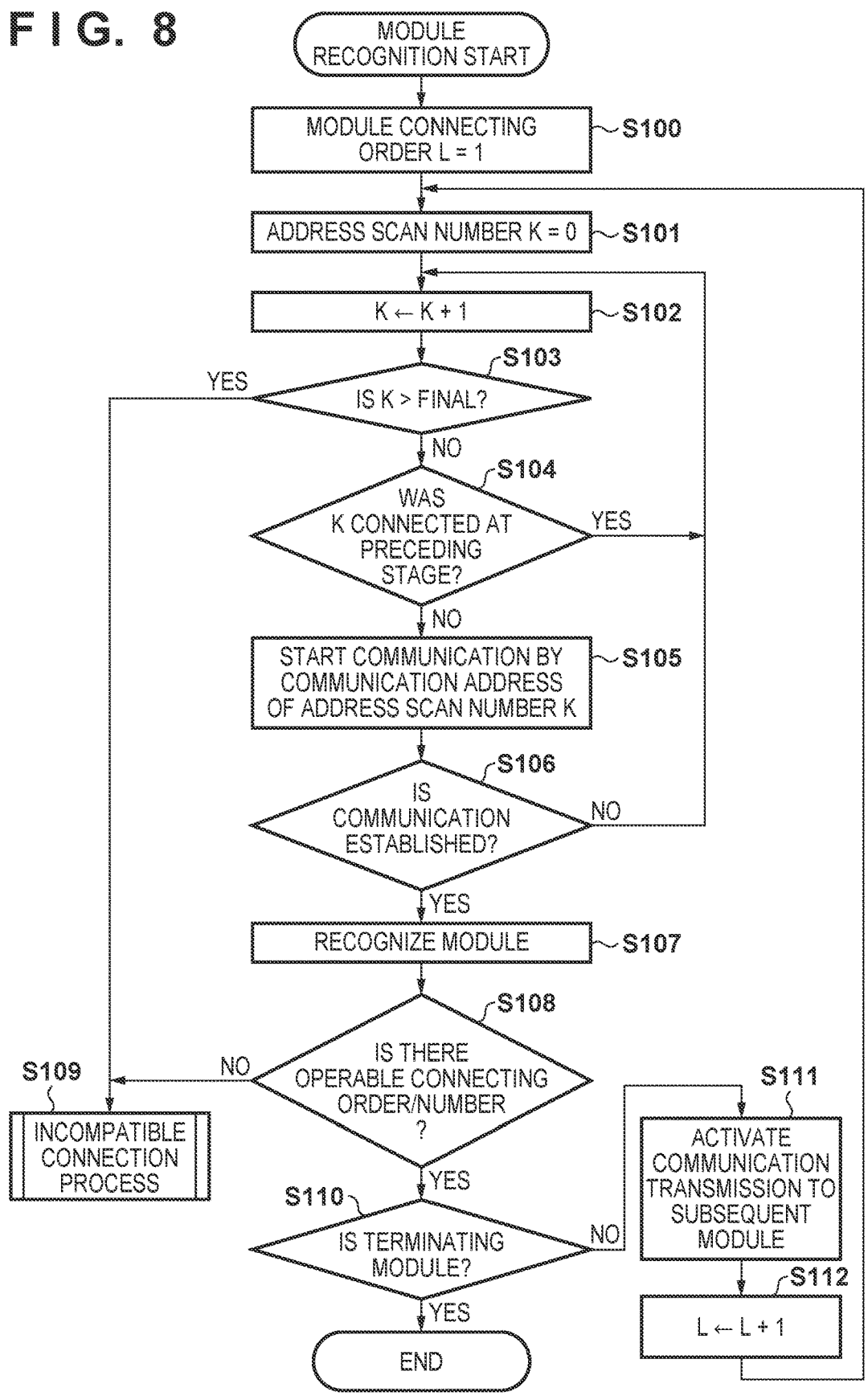
FIG. 8 is a flowchart for illustrating the module recognition process.

Next, with reference to the flowchart of FIG. 8, description is given for the module recognition process that is described above.

Firstly, the module recognition processing unit 502 scans addresses by changing the communication address and transmitting to it in order based on the connection correspondence information 503 of FIG. 6. Next, the module recognition processing unit 502 defines a number L indicating a connecting order of a module for which recognition is to be attempted. Here, L=1 indicates that a module that is currently to be recognized is the module first connected immediately after the main module 101. The module recognition processing unit 502 defines a scan number K as a number indicating an order for referring to the connection correspondence information 503 to perform a scan. The module recognition processing unit 502 inputs zero as an initial value and then causes it to increase by 1 (step S101, step S102) in order to set 1 as the number to scan first.

In a case where communication is attempted up to the final scan number but there was no corresponding address (YES in step S103), the module recognition processing unit 502 assumes an incompatible module and performs incompatible connection processing (step S109). In the first embodiment, the module recognition process ends. In other words, in a case where a communication address could not be found in accordance with an address scan that uses a communication address registered in the connection correspondence information 503, an operation for setting the connection route to a connected state ends. In addition, configuration is such that, when the scan number K is caused to increase, if the module for the scan number K is a module for which there is a connection at a preceding or earlier stage (YES in step S104), the module recognition processing unit 502 skips that number and does not execute communication. In this way, in a case where modules of the same type are connected, the module recognition processing unit 502 can process them as incompatible connections.

If the scan number K is less than or equal to the last scan number K and is not for a module that is connected to, the module recognition processing unit 502 refers to the connection correspondence information 503 and uses the communication address corresponding to the scan number K to attempt communication (step S105). If communication is not established (NO in step S106), K is caused to increase by 1 again and communication with a sub module at the communication address of the next number is attempted (step S102 through step S106). In this way, the module recognition processing unit 502 causes the scan number to increase one by one when communication is not established, and attempts communication using all communication addresses corresponding to a connection with the main module 101.

Meanwhile, if communication is established (YES in step S105), the communication address used in communication matches the communication address of the L-th module connected to. Accordingly, the module recognition processing unit 502 recognizes the L-th module as the module of the scan number K (step S107). In this way, a type corresponding to the communication address found out of the connection correspondence information 503 is recognized as the type of the L-th sub module. The module recognition processing unit 502 determines, based on the "connectable order", whether the connecting order of the recognized sub module satisfies a predetermined condition (step S108). In other words, setting an order (L) at which a communication address is found as the connecting order of a sub module, it is determined whether the connecting order of the sub module satisfies the predetermined condition based on the type recognized in step S107. In a case where the predetermined condition is not satisfied (a case where the connecting order is inappropriate) (NO in step S108), the module recognition processing unit 502 performs an incompatible connection process (step S109). For the incompatible connection process here, a warning display with respect to a user, forced ending of the electronic device 100, or the like is envisioned. In addition, if the number of sub modules whose connection route is changed to the connected state exceeds a limit number (YES in step S108), an incompatible connection process (step S109) is also performed, and for example an operation for changing a connection route to the connected state ends.

If the predetermined condition is satisfied (YES in step S108), the module recognition processing unit 502 determines whether the recognized sub module is a module connected as a termination, as with a power module (step S110). If the module is not a module that is connected as termination (NO in step S110), the module recognition processing unit 502 activates the communication transmission circuit of the L-th module to enable communication with the subsequent L+1-th module (step S111). In the first embodiment, the module recognition processing unit 502 uses a found communication address to instruct a sub module to change a connection route from the disconnected state to the connected state. The communication transmission unit 407 has the connection route enter a connected state in accordance with this. The module recognition processing unit 502 causes L to increase by 1, and advances to a recognition process for a subsequent sub module (step S112). Meanwhile, in the case where a recognized sub module is a module that is connected as a termination (YES in step S110), the module recognition process ends at that point. Note that, in the example described above, the connection route to a subsequent sub module is set to the connected state in accordance with an instruction from the main module 101, but there is no limitation to this. For example, in a case where the communication control unit 404 confirms establishment of communication with the main module 101, the communication control unit 404 may control the communication transmission unit 407 to change the connection route to the connected state.

Next, description is given of an example in which the module configuration illustrated in FIGS. 7A through 7G is recognized in accordance with the module recognition process described above.

Firstly, the module recognition processing unit 502 starts recognition of the module connected first with L=1. At this point, an address scan starts based on the connection correspondence information 503 of FIG. 6. As the initial scan number 1 is for "battery A", the communication address to transmit to first is 0x21. However, the module connected to first is the "module A", and communication is not established as its communication address is 0x10. Accordingly, communication with the "battery B" (communication address 0x22) which is the next scan number 2 is attempted. If that also is not established, the next "battery C" (communication address 0x23) is attempted. In this way, communication is attempted in order, and the communication address 0x10 is used when the scan number K=5, and communication with the first module is established.

In this way, the module recognition processing unit 502 recognizes that the module connected first is the "module A (external I/O module)". Furthermore, the "module A" is not a terminating module, and the predetermined condition (for example: L=1) is satisfied. Accordingly, the module recognition processing unit 502 activates the communication transmission unit 407*a* of the module A (step S111). The module recognition processing unit 502 increases L by 1, and starts a recognition process for a subsequent module (step S112).

Similarly, after recognizing that the second module for L=2 is the "module B", the module recognition processing unit 502 proceeds to recognition of the third module with L=3. The module recognition processing unit 502 recognizes that the third module is the "battery A", and from the connection correspondence information 503 recognizes that this is a terminating module. As a result, with L=3, the module recognition process for the electronic device 100 ends.

As described above, by the first embodiment, the main module 101 can recognize the connected state of sub modules. Furthermore, the main module 101 can determine whether the connecting order of a respective sub module satisfies a predetermined condition. Consequently, the main module 101 can prompt a user so that sub modules are connected in an order such that transmission signal quality, power supply efficiency, electromagnetic interference (EMI), electromagnetic compatibility (EMC), or the like between sub modules is in a better state for the electronic device 100 which provides a predetermined function or service.

For example, when a sub module needing the exchange of a large amount of data such as image data (including still images or a moving image) is connected with the main module 101, high-speed data communication occurs between the main module 101 and that sub module. When a connection distance between the main module 101 and the sub module increases, routing for the foregoing high speed data communication lengthens, and an undesirable state from the perspective of EMI is entered. Accordingly, it is desirable for usage where the connection distance between the main module 101 and the sub module is shortened in order to have usage in an advantageous situation with respect to EMI. By virtue of the first embodiment, in accordance with the "connectable order" in regard to such a sub module, it is possible to limit a connection to a near connection with the main module 101 such as immediately after the main module 101 or a further one afterward.

Second Embodiment

The various functions, processes, or methods described in the first embodiment can be realized by a personal computer, a microcomputer, a CPU (central processing unit), a processor, or the like using a program. Below, in the second embodiment, a personal computer, a microcomputer, a CPU (central processing unit), a processor, or the like is referred to as a "computer X". In addition, in the second embodiment, the program for realizing the various functions, processes, or methods described in the first embodiment is a program for controlling the computer X, and is referred to as a "program Y".

The various functions, processes, or methods described in the first embodiment are realized by the computer X executing the program Y. In such a case, the program Y is supplied to the computer X via a computer-readable storage medium. A computer-readable storage medium in the second embodiment includes at least one of a hard disk apparatus, a magnetic storage apparatus, an optical storage apparatus, a magneto-optical storage apparatus, a memory card, a volatile memory, a non-volatile memory, or the like. The computer-readable storage medium in the second embodiment is a non-transitory storage medium.

While aspects of the present invention are described with reference to exemplary embodiments, it is to be understood that the aspects of the present invention are not limited to the exemplary embodiments. The scope of the following claims is to be accorded the broadest interpretation so as to encompass all such modifications and equivalent structures.

This application claims priority from Japanese Patent Application No. 2017-068740, filed Mar. 30, 2017, which is hereby incorporated by reference herein in its entirety.

What is claimed is:

1. An electronic device comprising:
a main hardware module;
sub hardware modules including a first sub hardware module, a second sub hardware module, and a third sub hardware module;
a memory storing communication addresses;
a search unit that searches the communication addresses for a first communication address that is used by the main hardware module to communicate with the first sub hardware module, in a case where a connection route between the first sub hardware module and the second sub hardware module is in a disconnected state; and
a changing unit that changes the connection route between the first sub hardware module and the second sub hardware module from the disconnected state to a connected state, after the first communication address is found,
wherein the search unit searches the communication addresses for a second communication address that is used by the main hardware module to communicate with the second sub hardware module, in a case where a connection route between the second sub hardware module and the third sub hardware module is in a disconnected state and after the connection route between the first sub hardware module and the second sub hardware module is changed from the disconnected state to the connected state.

2. The electronic device according to claim 1, wherein the main hardware module determines a type corresponding to the first communication address as a type of the first sub hardware module, and determines a type corresponding to the second communication address as a type of the second sub hardware module.

3. A method comprising:
searching communication addresses for a first communication address that is used by a main hardware module to communicate with a first sub hardware module, in a case where a connection route between the first sub hardware module and a second sub hardware module is in a disconnected state;
changing the connection route between the first sub hardware module and the second sub hardware module from the disconnected state to a connected state, after the first communication address is found; and
searching the communication addresses for a second communication address that is used by the main hardware module to communicate with the second sub hardware module, in a case where a connection route between the second sub hardware module and a third sub hardware module is in a disconnected state and after the connection route between the first sub hardware module and the second sub hardware module is changed from the disconnected state to the connected state,
wherein the communication addresses are stored in a memory that the main hardware module has.

4. The electronic device according to claim 1, wherein the search unit searches the communication addresses for a third communication address that is used by the main hardware module to communicate with the third sub hardware module, in a case where the third sub hardware module is a hardware module that supplies power to the main hardware module and after the connection route between the second sub hardware module and the third sub hardware module is changed from the disconnected state to the connected state.

5. The electronic device according to claim 4, wherein the main hardware module determines a type corresponding to the third communication address as a type of the third sub hardware module.

6. The electronic device according to claim 1, wherein the main hardware module includes an image sensor and is capable of acting as an image capturing apparatus.

7. The electronic device according to claim 1, wherein the third sub hardware module supplies power to the main hardware module.

8. The electronic device according to claim 1, wherein the main hardware module, the first sub hardware module, the second sub hardware module, and the third sub hardware module are separable from each other.

9. The electronic device according to claim 1, wherein the main hardware module includes the memory and the searching unit, and
wherein the first sub hardware module includes the changing unit.

10. The method according to claim 3, further comprising:
determining a type corresponding to the first communication address as a type of the first sub hardware module; and
determining a type corresponding to the second communication address as a type of the second sub hardware module.

11. The method according to claim 3, further comprising searching the communication addresses for a third communication address that is used by the main hardware module to communicate with the third sub hardware module, in a case where the third sub hardware module is a hardware module that supplies power to the main hardware module and after the connection route between the second sub hardware module and the third sub hardware module is changed from the disconnected state to the connected state.

12. The method according to claim 11, wherein the main hardware module determines a type corresponding to the third communication address as a type of the third sub hardware module.

13. The method according to claim 3, wherein the main hardware module includes an image sensor and is capable of acting as an image capturing apparatus.

14. The method according to claim 3, wherein the third sub hardware module supplies power to the main hardware module.

15. The method according to claim 3, wherein the main hardware module, the first sub hardware module, the second sub hardware module, and the third sub hardware module are separable from each other.

16. An electronic device acting as a main hardware module, comprising:
- a memory storing communication addresses; and
- a search unit that searches the communication addresses for a first communication address that is used by the main hardware module to communicate with a first sub hardware module, in a case where a connection route between the first sub hardware module and a second sub hardware module is in a disconnected state,
- wherein the connection route between the first sub hardware module and the second sub hardware module is changed from the disconnected state to a connected state, after the first communication address is found, and
- wherein the search unit searches the communication addresses for a second communication address that is used by the main hardware module to communicate with the second sub hardware module, in a case where a connection route between the second sub hardware module and a third sub hardware module is in a disconnected state and after the connection route between the first sub hardware module and the second sub hardware module is changed from the disconnected state to the connected state.

17. The electronic device according to claim 16, wherein the main hardware module determines a type corresponding to the first communication address as a type of the first sub hardware module, and determines a type corresponding to the second communication address as a type of the second sub hardware module.

18. The electronic device according to claim 16, wherein the search unit searches the communication addresses for a third communication address that is used by the main hardware module to communicate with the third sub hardware module, in a case where the third sub hardware module is a hardware module that supplies power to the main hardware module and after the connection route between the second sub hardware module and the third sub hardware module is changed from the disconnected state to the connected state.

19. The electronic device according to claim 18, wherein the main hardware module determines a type corresponding to the third communication address as a type of the third sub hardware module.

20. The electronic device according to claim 16, wherein the main hardware module includes an image sensor and is capable of acting as an image capturing apparatus.

21. The electronic device according to claim 16, wherein the third sub hardware module supplies power to the main hardware module.

22. The electronic device according to claim 16, wherein the main hardware module, the first sub hardware module, the second sub hardware module, and the third sub hardware module are separable from each other.

* * * * *